United States Patent [19]
Weiss et al.

[11] Patent Number: 6,064,037
[45] Date of Patent: May 16, 2000

[54] AIR-PERMEABLE HEATING DEVICE FOR A SEAT

[75] Inventors: Michael Weiss, Benediktbeuren; Hans-Georg Rauh; Günter Lorenzen, both of Olching; Ferdinand Schuller, Königsbrunn, all of Germany

[73] Assignee: W.E.T. Automotive System A.G., Germany

[21] Appl. No.: 09/230,924

[22] PCT Filed: Jun. 3, 1998

[86] PCT No.: PCT/EP98/03310

§ 371 Date: Feb. 3, 1999

§ 102(e) Date: Feb. 3, 1999

[87] PCT Pub. No.: WO98/55340

PCT Pub. Date: Dec. 10, 1998

[30] Foreign Application Priority Data

Jun. 3, 1997 [DE] Germany .................... 197 23 245

[51] Int. Cl.[7] .................... A47C 7/72; B60N 2/44
[52] U.S. Cl. .................... 219/217; 297/180.12
[58] Field of Search .................... 219/217, 549, 219/545, 529; 297/180.12

[56] References Cited

U.S. PATENT DOCUMENTS

| 3,738,702 | 6/1973 | Jacobs . | |
|---|---|---|---|
| 4,044,221 | 8/1977 | Kuhn | 219/217 |
| 4,413,857 | 11/1983 | Hayashi . | |
| 4,590,359 | 5/1986 | Mobius | 219/217 |
| 4,853,992 | 8/1989 | Yu . | |
| 4,923,248 | 5/1990 | Feher . | |
| 5,226,188 | 7/1993 | Liou . | |
| 5,723,845 | 3/1998 | Partington et al. | 219/217 |

FOREIGN PATENT DOCUMENTS

| 424160 | 4/1991 | European Pat. Off. . |
| 532902 | 3/1993 | European Pat. Off. . |
| 2561086 | 9/1985 | France . |
| 2572271 | 5/1986 | France . |
| 3938951 | 5/1990 | Germany . |
| 4233118 | 1/1994 | Germany . |
| 4239068 | 3/1996 | Germany . |
| 19726810 | 10/1998 | Germany . |
| 3-43987 | 2/1991 | Japan . |
| 2257608 | 1/1993 | United Kingdom . |
| 9409684 | 5/1994 | WIPO . |

*Primary Examiner*—John A. Jeffery
*Attorney, Agent, or Firm*—Rothwell, Figg, Ernst & Kurz, P.C.

[57] ABSTRACT

An air conditioning device for a seat comprises an air-permeable base body which is fitted under a seat surface, and a heating element fitted in the base body, or between the seat surface and the base body. The base body and the heating element are mat-shaped. They are arranged substantially parallel to each other, and have substantially equal surface areas.

13 Claims, 2 Drawing Sheets

AIR-PERMEABLE HEATING DEVICE FOR A SEAT

BACKGROUND OF THE INVENTION

1. Field of the Invention

The invention concerns an air conditioning device for a seat.

The words "seat," "seating surface," "seating ventilation," "sitting," and "air conditioning device for a seat" utilized in the following include both seats in the narrow sense and seat back rests, i.e. they additionally comprise in the following the terms "seat back rest," "seat back rest surface," "seat back rest ventilation," "leaning against," and "air conditioning device for a seat surface."

In the current state of the art, various seat heating devices and air conditioning devices for a seat with a channel system in the seat's padding are known. WO 95/14899, for example, reveals an active seat ventilation system with channels in the seat's padding. This seat ventilation, however, requires a very complex seat design. Uniform air distribution over large surfaces is not guaranteed.

DE 42 00 825 A1 reveals a cloth spacer design within the seat. Compared to a channel system in the seat padding, this offers the advantage of a simpler seat design and improves the passive temperature characteristics of vehicle seats. However, to ensure sufficient moisture transfer even under difficult environmental conditions, active ventilation of the cloth spacer design through radial or axial blowers is necessary. A ventilation system through pump effects in the seat design, e.g. through compressible channels in the seat's padding, is also feasible.

From DE 40 17 707 A1 we know of a cloth spacer design that is combined with a heddle-based car seat heating system. In this case, however, the distance between the heat conductors is so large that the air flowing through the cloth spacer design is not heated during active ventilation. Due to cooling effects, this can have disadvantageous physiological consequences for the person using the seat.

DE 42 33 118 A1 reveals a heating pad made of carbon fibers which are flexible but not elastic in the crosswise and lengthwise directions. Additionally, the production of heating pads requires high carbon consumption and therefore high material costs.

DE 34 23 657 A1 describes an air conditioning device for a seat in accordance with the preamble of claim #1 with an air-permeable padded cushion that is arranged under the seat surface and a slab heating element that is arranged between the seat surface and the padded cushion. This air conditioning device for a seat represents a combination of a seat heating system of the highest comfort level regarding heating speed, homogeneous thermal distribution and elasticity with a temperature control layer for seat ventilation. Hereby the following functions are combined:

air conduction and even air distribution conventional seat heating system without seat ventilation heating of the air that is fed for seat ventilation purposes to a physiologically safe temperature level A disadvantage of the air conditioning device for a seat described in DE 34 23 657 A1, however, consists in the fact that the base object, in this case the padded cushion, has a specific cushion thickness and therefore the air conditioning device for a seat must always be produced separately in close connection with each individual seat.

SUMMARY OF THE INVENTION

Thus, aim of the invention is to make available an air conditioning device for a seat which offers all of the advantages of the air conditioning device for a seat described in DE 34 23 657 A1, but which moreover is easier to produce and more flexible in its usage.

By designing the base object of the air conditioning device according to the invention in a mat-like fashion, i.e. compared to the padded cushion according to DE 34 23 657 A1 it is considerably thinner, the air conditioning device for a seat according to the invention can be produced as yard ware in automated mass production facilities. Additionally, the air conditioning device for a seat according to the invention can be stretched onto a seat cushion core like a cover, which simplifies assembly considerably. It even enables subsequent equipping of already existing seats with the air conditioning device for a seat according to the invention without problems. In accordance with one embodiment, one or several areas of the base object, which are mostly covered by the person sitting on the seat, are equipped with higher air permeability in unoccupied condition than the remaining area of the base object. This results in basically overall even air permeability for the air conditioning device for a seat in occupied condition, and it prevents a too high temperature gradient for the occupied air conditioning layer for the seat.

According to another embodiment, the air conditioning device for a seat according to the invention is equipped with a thermal-reflective layer on the side facing the seat surface and/or facing away from the seat surface. This thermal-reflective layer reflects the thermal rays coming from the heating element, and additional seat layers located under and/or above the seat temperature control layer are protected from thermal radiation. The same affect is achieved with the version according to a further embodiment, alternative "thermal-reflective coated fibers".

BRIEF DESCRIPTION OF THE DRAWINGS

Examples of the air conditioning device for a seat according to the invention are described in the following with the help of figures. They show.

DETAILED DESCRIPTION OF THE INVENTION

Figure 1:
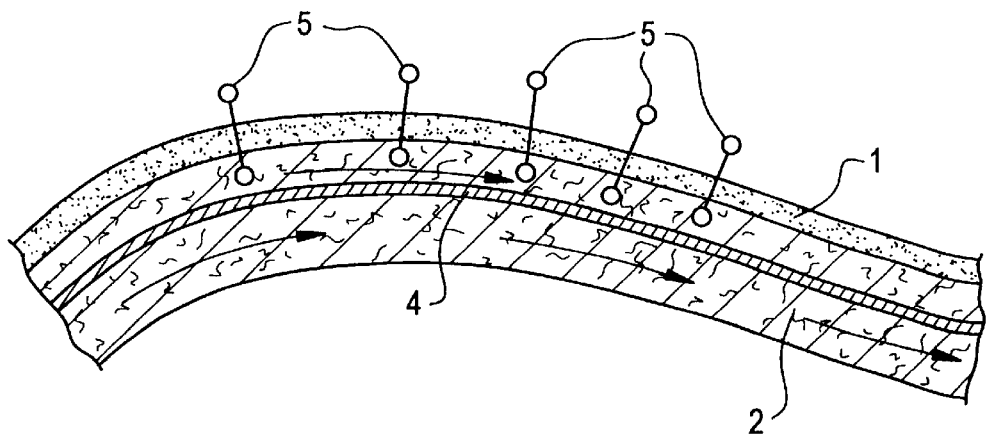
FIG. 1 a partial cross-section of a first seat with the first version of the air conditioning device for a seat according to the invention, FIG. 2 a schematic second seat with an enlarged partial cross-section of a second version of the air conditioning device according to the invention, and FIG. 3 a third version of the air conditioning device for a seat according to the invention.
Figure 2:
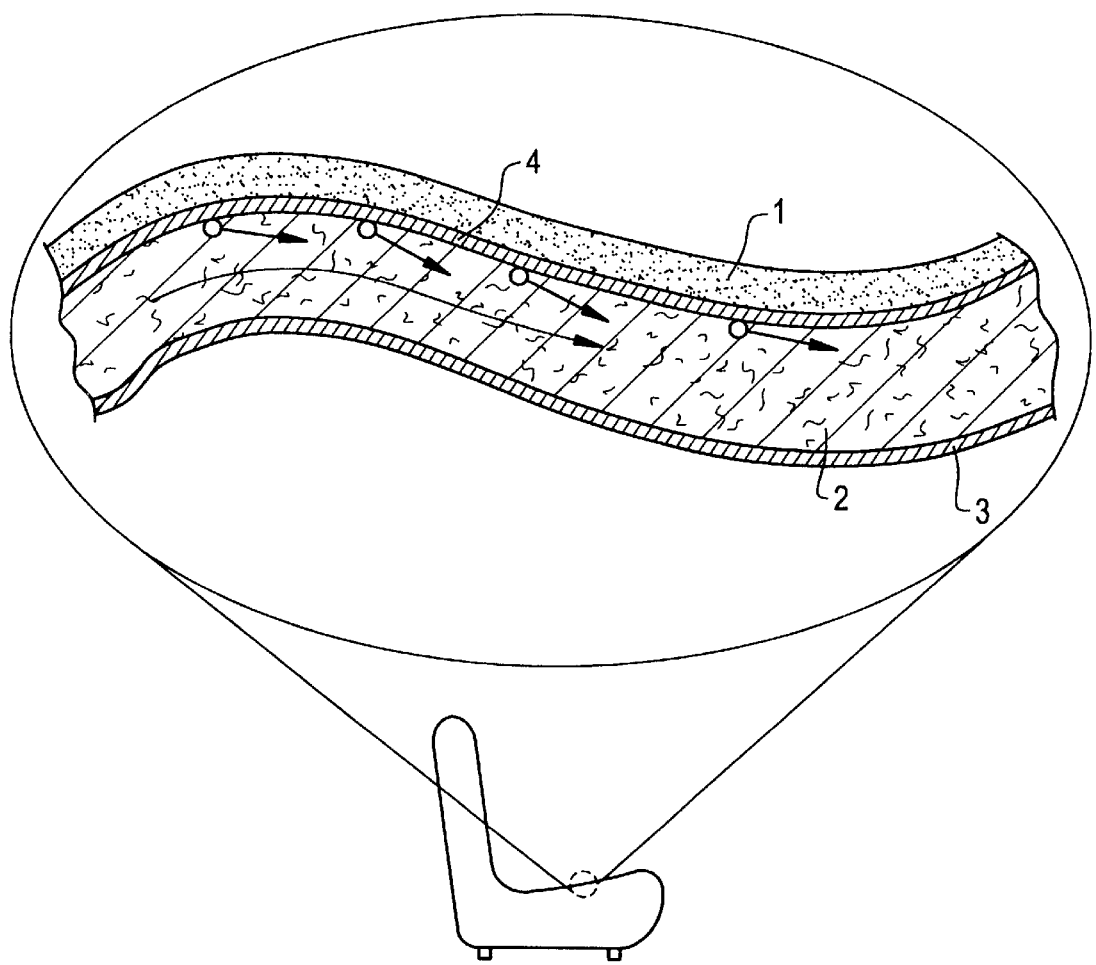

Prerequisite for comfortable, active seat ventilation is an even flow of air distributed over a large surface. By utilizing an air-permeable material layer as the mat-like base object 2 of an air conditioning device for a seat according to the invention, the necessary cross-current of air is ensured under the seat surface 1. In FIGS. 1 and 2, the air cross-currents through the base object 2 are shown as arrows pointing from left to right.

Figure 3:
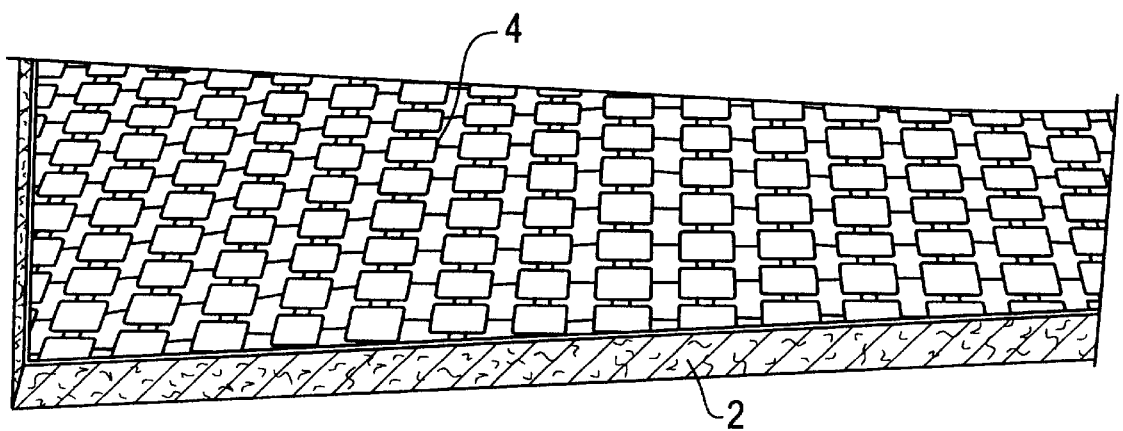
Figure 4:
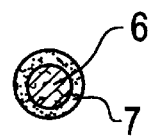
FIG. 4 is a cross-section of an aluminum-coated fiber of a seat according to one embodiment.

The base object 2 can consist of e.g. cloth spacers, rubberized hair, monofilament fabric, vertically oriented fibrous webs, reticulated foam or thermal-reflective coated fibers such as fiber 6 with aluminum coating 7 shown in FIG. 4. Its air permeability in normal direction, i.e. in the direction crosswise to its surface dimension, is preferably 300 liters per second (L/s) to 800 L/s at a differential pressure of 100 Pa relative to a surface of 1 dm$^2$, and its strain hardness is preferably 10 kPa to 15 kPa. The base object preferably has a thickness of 5 mm to 20 mm. In the example shown in FIG. 3 of the air conditioning device for a seat according to the invention the thickness of the mat-like base object 2 is 7 mm.

Part of the air conditioning device for a seat according to the invention is furthermore a mat-like heating element 4 which, as shown in FIGS. 2 and 3, can be arranged between the seat surface 1 and the base object 2, or—as depicted in FIG. 1—in the base object 2. The base object 2 and the heating element 4 are generally arranged parallel to each other and have the same size relative to the surface dimension.

In order to better separate the seat surface 1 and/or seat layers arranged beneath the base object 2 from the warmth generated by the combination of heating element 4 and base object 2, a thermal-reflective layer 3, e.g. an aluminum layer, can be arranged on the side facing the and/or facing away from the seat surface 1 of the air conditioning device for a seat according to the invention to minimize thermal radiation that is released. FIG. 2 shows a version of the air conditioning device for a seat according to the invention on which a thermal-reflective layer 3 is arranged on the side facing away from the seat surface 1. Instead of or in addition to this thermal-reflective layer 3 shown in FIG. 2, such a thermal-reflective layer is located over the heating element 4, i.e. between the heating element 4 and the seat surface 1, in other versions of the air conditioning device for a seat according to the invention. The thermal-reflective layer 3 can e.g. be a foil or an appropriate coating of the base object 2.

As shown in FIG. 2, the seat surface 1 can be air permeable. In order to ensure good moisture transfer, however, air-permeable covers are required, which could consist of cloth or perforated leather. FIG. 1 shows a partial cross-section of a seat with one version of the air conditioning device for a seat according to the invention and an air-permeable seat surface 1. The air current flowing through the seat surface 1 has been marked with the reference number 5.

Basically, however, we should note that even with airtight covers as the one shown on the seat in FIG. 2 even temperatures can be achieved with the air conditioning device for a seat according to the invention to counteract moisture formation.

Furthermore, the base object 2 can have partially differing air permeability. This is beneficial since air permeability is generally a function of the pressure load caused by the weight of the passenger. Partially differing air permeability can, for example, be achieved through locally varying thicknesses of the base object material or through masking layers. While locally varying thicknesses of the base object material affect both the air cross-currents and the air current 5 flowing through the seat surface 1, masking layers basically only influence the air current 5 flowing through the seat surface 1.

Since the passenger on the seat directly touches the seat surface 1, distribution of the temperature is necessary to exclude physiological risks, e.g. from hypothermic effects.

Temperature equalization of the air or the seat surface 1 occurs via the heating element 4. In doing so it is important that the heat conductor covers a certain minimum density of the surface. It is particularly beneficial to design the heating element 4 as a conductive sheet-type heating element in such a way that the distance from any point of the conductive sheet-type heating element to a heat conductor does not exceed 1 cm (0.4 inch). If the heating wire, for example, runs only undulatingly usually large unheated areas remain, preventing the air from being heated sufficiently. Suitable for usage in the seat comfort temperature control device according to the invention is, e.g., a heating element in accordance with patent DE 43 21 474 whose most distinct feature consists of a homogeneous heating performance over large surfaces. Compared to a heddle-based heating system, this system is equipped with 15 times more heat conductors for the same surface area that is to be heated. This ensures that all the air flowing through the base object 2 is heated, and thus no cold zones occur.

The heating element 4 could be for example:

electro-conductive homogeneous layers or foils, punched or slit electro-conductive textiles heat conductors arranged parallel or as network so that there are at least 100 m (110 yards) of heat conductors per square meter (11 square feet) of heating element 4.

The heating element 4 can be combined with the base object 2 in various ways. Possibilities, for example, include that the heating element 4 is installed into the base object material during the manufacturing process, the heating element 4 is installed onto the base object 2 later on, or that the heating element 4 is installed onto the base object 2 as an autonomous component.

Through appropriate regulation of the heating element 4 with the help of one or more temperature sensors located in the air current, the temperature of the flowing air 5 or the seat surface 1 can be maintained within a comfortable and physiologically safe range.

The heat conductors that are used are preferably carbon multi-filaments or carbon fiber mixed twines due to mechanical, chemical and electrochemical demands.

What is claimed is:

1. In a seat, an air conditioning device comprises an air-permeable base object arranged under a surface of said seat and a heating element arranged in said base object, said base object and said heating element being of a mat-like shape having a surface dimension, said base object and said heating element being substantially aligned parallel to each other, and being substantially of equal size relative to their surface dimension, wherein at least one area of said base object, which corresponds to an area intended to be covered by a person occupying said seat, is provided with a higher air permeability in an unoccupied condition than a remaining area of said base object, such that the air permability of said base object is substantially even in an occupied condition.

2. Air conditioning device as claimed in claim 1, wherein said heating element is arranged in said base object.

3. Air conditioning device as claimed in claim 1, wherein said heating element is arranged between said surface of said seat and said base object.

4. Air conditioning device as claimed in claim 1, wherein said heating element is conductive sheet-type heating element comprising heat conductors, and wherein a distance from any random point of the conductive sheet-type heating element to a heat conductor is not larger than 1 cm (0.4 inch).

5. Air conditioning device as claimed in claim 1, wherein in a normal direction with respect to a plane of said base object, the base object has an air permeability of 300 liters per second to 800 liters per second at a differential pressure of 100 Pa relative to a surface of 1 dm$^2$.

6. Air conditioning device as claimed in claim 1, wherein said base object has a thickness of between 5 and 20 mm (0.2 and 0.80 inch).

7. Air conditioning device as claims in claim 1, wherein said base object has a strain hardness of between 10 kPa and 15 kPa.

8. Air conditioning device as claimed in claim 1, wherein said base object is comprised of aluminum-coated fibers.

9. Air conditioning device as claimed in claim 1, further comprising a thermal-reflective layer on a side of said device that faces the seat surface.

10. Air conditioning device as claimed in claim 9, further comprising a thermal-reflective layer on a side of said device that faces away from the seat surface.

11. Air conditioning device according to claim 9, characterized in that said thermal-reflective layer is an aluminum layer.

12. Air conditioning device as claimed in claim 1, further comprising a thermal-reflective layer on a side of said device that faces away from the seat surface.

13. In a seat, an air conditioning device comprises an air-permeable base object which is comprised of aluminum-coated fibers and arranged under a surface of said seat, and a heating element, said base object and said heating element being of a mat-like shape having a surface dimension, said base object and said heating element being substantially aligned parallel to each other, and being substantially of equal size relative to their surface dimension, wherein at least on area of said base object, which corresponds to an area intended to be covered by a person occupying said seat, is provided with higher air permeability in unoccupied condition than a remaining area of said base object, such that the air permability of said base object is substantially even in an occupied condition.

* * * * *